United States Patent
Surowiak et al.

(10) Patent No.: US 12,359,689 B2
(45) Date of Patent: Jul. 15, 2025

(54) RIBBED SCREWBOSS

(71) Applicant: Aptiv Technologies AG, Schaffhausen (CH)

(72) Inventors: Kacper Surowiak, Cracow (PL); Batlomiej Kaminski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/510,080

(22) Filed: Nov. 15, 2023

(65) Prior Publication Data
US 2024/0159263 A1 May 16, 2024

(30) Foreign Application Priority Data
Nov. 16, 2022 (EP) .................................. 22207891

(51) Int. Cl.
F16B 29/00 (2006.01)
F16B 5/02 (2006.01)

(52) U.S. Cl.
CPC ................ *F16B 29/00* (2013.01); *F16B 5/02* (2013.01)

(58) Field of Classification Search
CPC ........ F16B 29/00; F16B 5/02; F16B 25/0015; F16B 25/00; F16B 37/005; F16B 2037/007
See application file for complete search history.

(56) References Cited

U.S. PATENT DOCUMENTS

| | | | |
|---|---|---|---|
| 3,722,565 A * | 3/1973 | Miller, Jr. ............... | F16B 12/52 248/188.4 |
| 10,006,481 B2 | 6/2018 | Tomatsu | |
| 11,078,948 B2 | 8/2021 | Yepes Gallo | |
| 12,092,144 B2 * | 9/2024 | Yoshida ................ | F16B 37/048 |
| 2013/0330149 A1 * | 12/2013 | Chen ..................... | F16B 37/005 411/360 |
| 2015/0114544 A1 * | 4/2015 | Amstutz ................. | F16M 13/02 248/205.3 |
| 2019/0120269 A1 * | 4/2019 | Jensen .................. | F16B 47/003 |

FOREIGN PATENT DOCUMENTS

| | | |
|---|---|---|
| CN | 205025880 U | 2/2016 |
| DE | 102009032945 A1 | 1/2011 |
| JP | 4437132 B2 | 7/2008 |
| WO | 2018157894 A1 | 9/2018 |

OTHER PUBLICATIONS

Extended European Search Report for EP App. No. 22207891.7, dated May 9, 2023, 7 pages.

* cited by examiner

*Primary Examiner* — Sarang Afzali
*Assistant Examiner* — Darrell C Ford
(74) *Attorney, Agent, or Firm* — Miller Johnson

(57) ABSTRACT

A screwboss including a base, a main body, an opening into an end of the main body, distal from the base for fixing a threaded fastener thereinto. The screwboss further includes at least one rib adjoining the base and the main body to support the main body in an upstanding position. At least one rib extends from the main body at a position offset from a radial line from a center axis of the opening and toward a tangent from the opening.

15 Claims, 2 Drawing Sheets

RIBBED SCREWBOSS

CROSS-REFERENCE TO RELATED APPLICATIONS

This application claims priority to EP App. No. 22 207 891 filed Nov. 16, 2022, the entire disclosure of which is incorporated by reference.

FIELD

The present disclosure relates to a screwboss, a boss for a self-tapping screw, featuring a pilot hole into which a self-tapping screw may be screwed to hold a component in place.

BACKGROUND

A screwboss is a common solution to ensure correct positioning of a metal self-tapping screw into a plastic hole. A typical example of a screwboss, alternatively termed a screw post or stalk, comprises a cylindrical body made from a deformable plastics material with a hole (e.g. a blind bore) formed at its central axis to receive a self-tapping screw. The body is formed to be upstanding from and integral with a support surface/base and may include two or more ribs radiating from the central axis that provide additional stability for mitigating lateral movement and absorbing twisting forces applied to the body relative to its support surface while a screw is turning into the hole.

In use, one or more separate component elements may be secured by virtue of their own through holes aligning with that of the screwboss and a self-tapping screw compatible with the hole dimensions being introduced through both the component(s) and into the boss. By virtue of a harder material (e.g. metal) the screw thread bites into the plastic inner wall of the hole and is drawn thereinto. The hole may have surface features (e.g. bevels/internal ribs) for guiding the screw or be relatively smooth, but it is always deeper than the length of the screw, so as it accommodate the screw shaft fully up to its head when components are in place. The deformable wall of the hole/body may marginally expand to accommodate the screw, further reinforced by the radial ribs.

A screwboss serves to separate component surfaces by virtue of its body height and mounts the components securely in place, often for the lifetime of the assembled product. However, a self-tapping screw is removable by turning in a reverse direction of the screw thread and thereby withdrawing it from the hole. As such, component elements of a product can be disassembled if required.

A screwboss is subject to torsion forces as the self-tapping screw is engaged. Design of the screwboss must therefore account for being able to withstand these forces, traded off against material (e.g. plastics, alloy, aluminum) use in manufacturing the component. Particularly, the relative resilience of the screwboss to torsion forces will affect the speed at which a screw can be screwed into its hole, thereby having an impact on the overall cycle time for assembling a component/product, which may have multiple screwbosses integrated therewith. Ribs are provided as a support structure and also contribute reinforced strength to the boss and its ability to expand to accommodate a screw. It is known to skilled persons that if an excessive torque force is applied, e.g. due to high speed screwing, then a screwboss can fail.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In light of the above, the present invention seeks to address shortcomings associated with known screwboss structures and proposes an improvement, particularly a solution that may enable a reduction in cycle time/increase in turning speed of a screw for an equivalent or reduced materials usage during manufacture.

A first aspect of the invention is outlined according to claim 1 of the appended claims. For example, a screwboss may be comprised of: a base; a main body, upstanding from the base, having an external sidewall and an opening for fixing a screw threaded element thereinto; and a plurality of ribs, each spanning between/adjoining the base and main body; wherein at least one rib of the plurality of ribs extends from a location on the external sidewall parallel with but angularly offset from a normal radial line taken from a center of the opening. The offset may be at least a half thickness of a rib from the radial line. The rib, at the point it is connected to the boss sidewall, is positioned to extend parallel to the radial line offset toward (which includes coinciding with or beyond) a parallel tangent line from the opening for fixing a screw, so as to be offset from the normal radial line it is parallel with.

In this way, the screwboss of the invention has the effect of providing an alternative rib location to better accommodate the torque forces created by self-tapping screws and, hence, enable a potentially increased speed of screwing. Thereby, the problem of slow cycle time during screwing into plastic is solved, e.g. by offsetting where a rib is attached to the body to be located to one side of an imaginary radial line taken from the hole/boss center, exactly where the forces distributed during self-tapping are found.

By virtue of the novel structure disclosed herein, ribs are located at a place where forces are best distributed in order to correctly enforce the screwing process. The boss body maintains a freedom to expand while reinforced by the ribs, thereby resulting in decreased cycle time and/or reduced chance of breakage/failure of the boss.

In conventional designs, supporting ribs are arranged radially in a uniform cross configuration from a center of the screw-hole, whereas ribs of the invention are offset from that normal radial position taken from a center of the fixing opening. The offset may be either counter-clockwise or clockwise. In one form the rib offset from a normal radial line is counter/anti-clockwise, to account for a clockwise screw direction as is most common. However, the configuration would be reversed to a clockwise offset for an intended left-hand screw direction.

An entire thickness of a rib is outside the radial line from the center, but at least begins parallel thereto. A rib thickness may be approximately equal to a diameter of the opening, but any suitable dimensions are contemplated.

Each rib is typically of a uniform shape with other ribs, but different rib configurations/shapes are possible.

Furthermore, a rib may be configured to taper outwardly from a connecting position at the body's sidewall distant from the base, toward the base. In other words, the ribs are wider where connected at the base than where connected further up the main body. Outward tapering of a rib may be either in the longitudinal direction of the upstanding body or radially from the body, or both. In the case of a radial taper or draft angle design, reinforcement at upper portions of the boss is minimized for less resistance to screw forces, compared to at the base where the upstanding main body must be supported from breaking off laterally during finalization of the screw cycle and for a lifetime of the assembled product. Torque is greatest at the end of the cycle where a screw head abuts the main body and is prevented from further entry into the hole.

A height of the main body may be determined by assembly parameters, particularly the length of screw that is to be inserted/fixed into the hole. The depth of receiving hole is beyond total invasive length of a screw shaft, considering the thickness of component elements secured to the boss.

In practice the screwboss is formed in one piece such that the base, body and ribs are integrally formed and made from a continuous piece of material, e.g. by injection molding, however, co-molding or other manufacturing methods may be possible. The screw boss may be formed from plastics, metal (e.g. aluminum) or other flowable/moldable material.

The screwboss may be aligned for mounting and securing various components or sandwiches of multiple components, e.g. a PCB alone or with a cover plate, that is screwed to a base component which featuring an upstanding screwboss according to the invention.

An upstanding leading edge of an outside face of the rib, where it is connected to the side wall, extends approximately 45 degrees from an imaginary line normal to the sidewall, to optimally provide support resisting the torque force applied by a turning screw during assembly and for a final torque applied to hold components in place. As mentioned, such a configuration is able to accommodate faster screwing speeds at the beginning and during the screwing cycle for the same material use as conventional radial ribs.

In an alternative expression of the invention, a plane (e.g. a central plane) of the rib is approximately tangential to an edge of the screw-receiving opening or between a tangent of the opening and a tangent of the main body. In other words, at least part of the thickness of the rib, where it connects with the boss side wall, is tangential or overlaps with a tangential line from the opening. In this way, forces developed at the wall of the opening, where a screw thread contacts the wall and applies force, are transferred evenly to the rib.

Broadly, the invention is embodied by a screwboss comprised of: a base; a main body; an opening into an end of the main body, distal from the base, for fixing a threaded fastener thereinto; and at least one rib, adjoining the base and main body, to support the main body in an upstanding position; wherein the at least one rib extends from the main body at a position in line with a tangent line from the opening. The rib position should be interpreted as anywhere between a tangent line from the opening to a tangent line of the main body.

The tangent line coincides within a thickness of the at least one rib. In one form, the at least one rib is parallel and offset to the side of a radial line extending from a center of the opening.

The at least one rib is tapered inwardly in a longitudinal direction from the base toward the main body. Alternatively, or in addition, the at least one rib may extend outwardly from the main body, with a draft angle.

The at least one rib may comprise a plurality of ribs, each at a position in line with a tangent line from the opening. Each rib of the plurality of ribs may radiate at an even spacings about the main body.

The screwboss is configured for a right-hand screw threaded fastener, wherein the at least one rib is offset in a counter-clockwise direction from the radial line.

The at least one rib is offset far enough so as not to overlap with the radial line.

The invention extends to a component incorporating a screwboss according to any desirable feature herein, e.g. configured for use in assembly of a vehicle.

The invention further extends to a method for mounting a first component part to a base component part, according to claim 12 e.g. in a vehicle.

There are four ribs, however, the solution may suffice with one rib, especially if the boss body is set into the corner of a component. Two, three or five or more ribs may also be appropriate depending on space constraints and scale of the boss.

In an alternative expression of the invention, a screwboss is provided where each of a plurality of ribs is parallel with but offset from a directly radial line taken from a center of the screw boss.

The invention is applicable not just to self-tapping screws but also threaded members such as bolts. In these cases, a corresponding thread may be tapped/molded into the receiving hole. Torque forces are still developed in such an arrangement, especially at the end of the cycle when a fastener may be set at a desired torque to hold a component in place.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The following description presents various embodiments and, together with the drawings, serves to explain principles of the invention. However, the scope of the invention is not intended to be limited to the precise details of the embodiments or exact adherence with all features and/or method steps, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "sideways", "upper" and "lower" are used for convenience of explanation usually with reference to the orientation shown in illustrations and are not intended to be ultimately limiting if an equivalent function can be achieved with an alternative dimension and/or direction. Indeed, in the present case a term such as "horizontal" axis or "vertical" axis can be affected by the orientation imposed on the screwboss structure. Therefore, all directional terms are relative to each other.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

It will be understood that the illustrated embodiments show applications only for the purposes of explanation. In practice, the invention may be applied to many different configurations, where the embodiment is straightforward for those skilled in the art to implement.

Figures 1, 2:
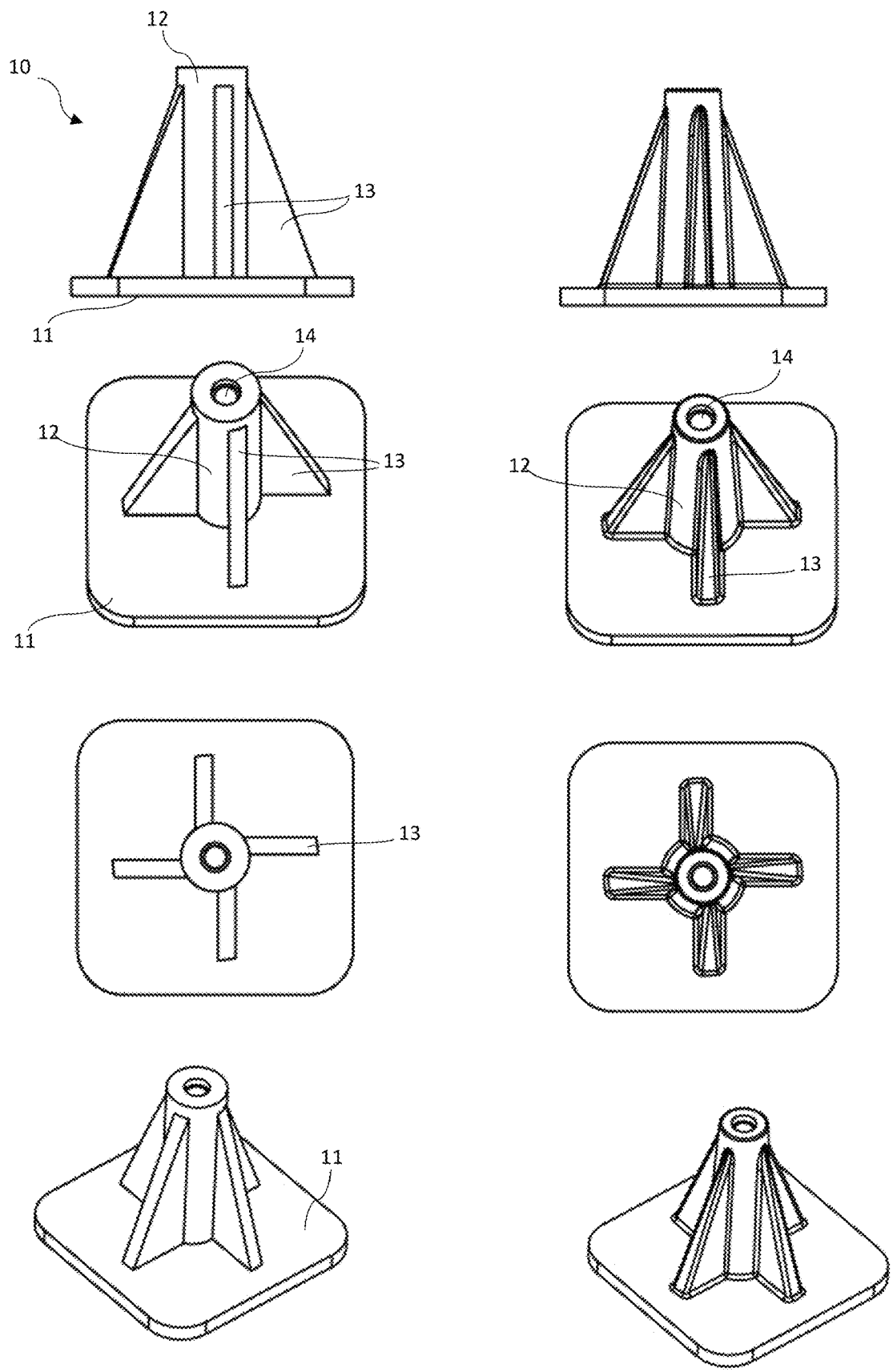
FIG. 1 illustrates a series of views of a first embodiment of screwboss according to the invention.
FIG. 2 illustrates a series of views of a second embodiment of screwboss according to the invention.

FIG. 1 outlines a series of views from various perspectives of a screwboss 10 according to the invention. Screwboss 10 is generally comprised of a base 11 (which will in practice be part of a larger component element than that illustrated), an upstanding main body 12 and a plurality of ribs 13.

In the illustrated form, main body 12 is generally cylindrical in shape, although it may have other elongate forms, and features a central opening 14 for receiving a screw fastener. In the illustrated example, the opening has a beveled edge or annular inset, but otherwise has smooth walls down to a specified depth (e.g. seen in FIG. 7 example). In principle the opening may be all the way through body 12 and base 11, but is more likely a blind bore that at least leaves an open space beyond the distal end of a screw.

Figure 3:
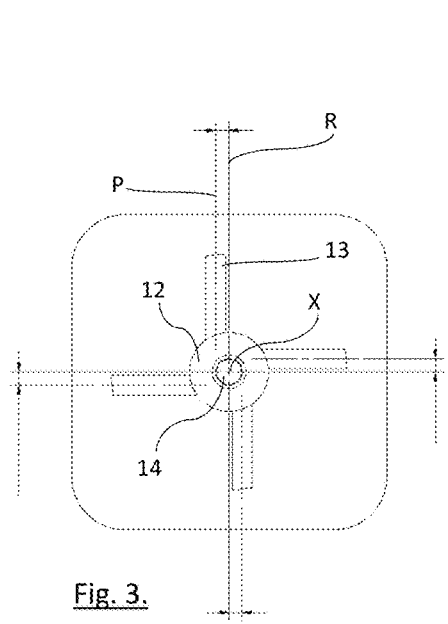
FIG. 3 illustrates a plan view of a screwboss with various dimensions.
Figure 4:
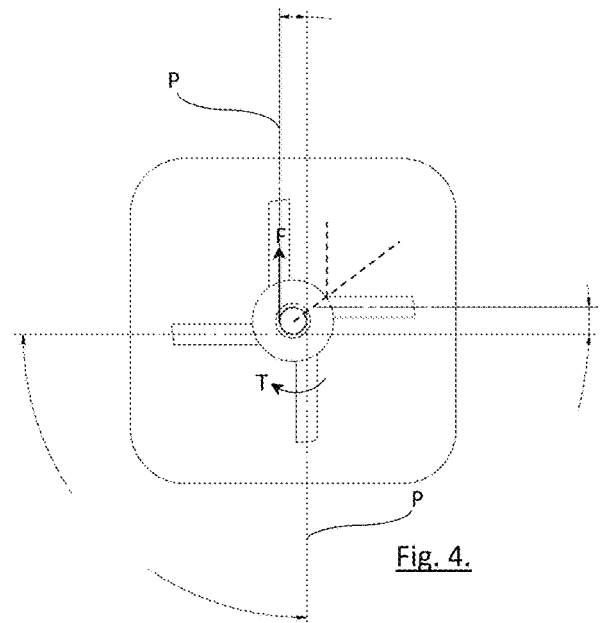
FIG. 4 illustrates a further plan view of a screwboss with various dimensions and directions of force.

As best seen in the plan views of FIGS. 1 to 4, each rib 13 extends away from a side wall of body 12 in a position that is parallel but offset to a radial line (R) taken from a central axis (X) of the opening/body. In this way, ribs extending from opposite sides of the body 12 are not aligned and appear offset from one another. Yet, in the illustrated form with four ribs, the offset between adjacent ribs is still ninety degrees as it would be for a regular cross configuration, as shown by FIG. 4. Ribs are shown with even spacing therebetween.

With reference to FIGS. 3 and 4, a desirable position of a rib according to the invention can be described in several ways. Firstly, a central plane P of a rib 13 is shown as parallel to and offset from a radial line R, e.g. by more than half a thickness of rib 13. Secondly, central plane P of rib 13 is substantially tangential to a wall of opening 14 where, in use, a screw fastener would contact the boss body 12 and apply force thereto, e.g. in a clockwise direction assuming a common right-hand screw thread. A directional force line F is shown in FIG. 4, resulting from a torsion force T caused by rotation of a screw fastener. Thirdly, an upstanding leading edge of an outside face of the rib, where it is connected to the side wall 12, begins approximately 40-70 degrees from the center axis X of the hole. In all explanations, the position of the rib 13 optimally provides support for resisting the torque force F applied by a turning screw during assembly and for a final torque applied to hold a component in place.

In general, it is apparent that rib 13 is offset to one side of radial line R and not overlapping therewith. Alternatively, or in addition, at the point where rib 13 is connected with body 12, it extends from and overlaps with a tangent of opening 14. Any part across the thickness of a rib 13 may coincide with a tangential line from the hole/opening 14. According to FIG. 4, the center plane P coincides with tangential line G.

The embodiment of FIG. 1 features four ribs 13 in the form of right-angle triangular wedges, where the right-angle corner is located at the join between base 11 and upstanding main body 12. The thickness is uniform, although alternative configurations are possible.

FIG. 2 illustrates an alternative embodiment of screw boss 10 where a rib 13 is configured to taper with a draft angle outwardly from the main body 12, toward base 11 where the rib is thickest. Indeed, in some embodiments body 12 may be independently tapered outwardly from the opening end 14 toward the base 11. A draft of the type illustrated may assist with removal from an injection molding tool, without significantly affecting its strength for accommodating torsion forces. As shown in the plan view of FIG. 2, the positional arrangement of ribs 13 is otherwise analogous to that of FIGS. 1, 3 and 4.

Figure 5:
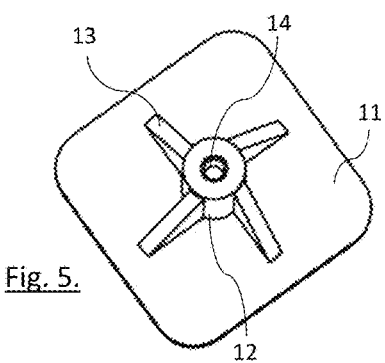
FIG. 5 illustrates an overview of a third embodiment of screwboss.

FIG. 5 illustrates a variation of the embodiment of FIG. 1, where the effective upstanding height of body 12 is reduced. However, the function and position of ribs 13 remains the same. Any embodiment of the screwboss may have a height tailored to the length of screw needed for securing a component or to provide clearance or surface features on a component.

Figure 6:
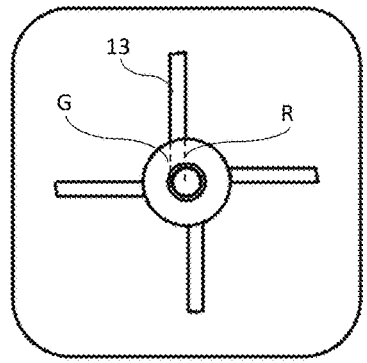
FIG. 6 illustrates a plan view of a fourth embodiment of screwboss.

FIG. 6 illustrates a variation where substantive external surfaces of the rib 13 are at positions approximately in line with a tangent line G from the opening and a radial line R from the center axis X respectively. As before, rib 13 is generally offset from and parallel with the radial line R, but now with a thickness that is approximately equal to the radius of the opening 14 (i.e. half the diameter). This may give an example of an optimum position for a rib which uses less material but is best positioned for absorbing torque forces from a screw. It is noteworthy that, for all embodiments, a rib begins to extend from a position in line with (i.e. with any part of its thickness overlapping or at least an external surface in line with) a tangent to the opening, but an end of the rib distal from its connection to the main body may deviate from a straight line. A rib could be curved so long as it begins at a tangential position.

Figure 7:
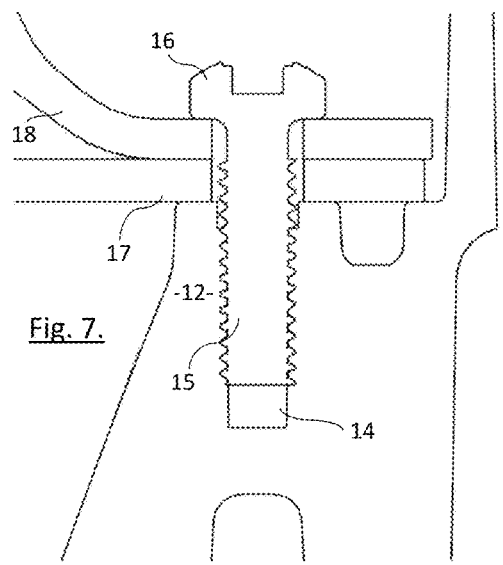
FIG. 7 illustrates a section view of a screw fastener in place with a screwboss for holding components of a product together.

FIG. 7 illustrates a cross section view of an assembled product/component where a (e.g. self-tapping) screw fastener, having a threaded shaft 15 and head 16, has been driven into the blind hole 14 of a boss body 12. Head 16 is generally rotated into engagement by a tool at a predetermined torque force, where shaft 15 passes through aligned openings of one or more component flanges 17 and 18. It will be apparent that flange layer 17 (e.g. a PCB) is mounted in contact with screw boss 12 so as to distance electrical components on its surface from undesirable contact with a base (not shown) of the boss or a cover component 18.

While not easily visible in FIG. 7, outwardly extending ribs of the invention are arranged to accommodate the torque force as shaft 15 engages and drives into hole 14 and at conclusion of the screw cycle where head 16 contacts the components (17, 18) being secured.

Figure 8:
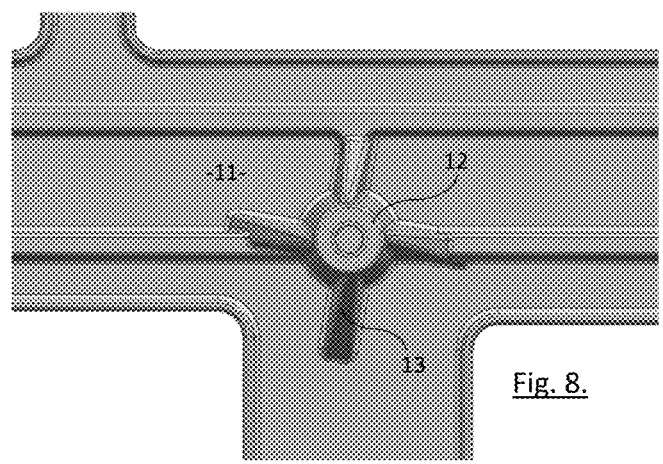
FIG. 8 illustrates frontal view of a product component featuring a screwboss of the invention.

FIG. 8 illustrates a plan view of base component 11 incorporating a boss 12 and rib structure 13 as described above. Ribs 13 may be incorporated with other strengthening ribs of the base 11. In a case where boss 12 is located in the corner of a component, upstanding side walls extending from base 11 may provide a supporting function with a variation in size and/or number of supporting ribs according to the invention.

In consideration of the above, the improved rib structure is configured for mitigating forces applied during driving of a screw into a boss. Cycle time during the screwing process may be reduced. Assuming a similar amount of materials used in constructing the boss 12, heat generation during screwing is expected to remain the same, or a bit higher due to faster screwing.

By way of summary, the invention is generally embodied by a screwboss comprised of a base and an upstanding main body having an opening at one end thereof. A series of ribs are spaced apart about the main body, each at a position offset from a normal radial position, i.e. generally coinciding with (toward, at or beyond) an imaginary tangent line extending from an edge of the opening. In this way, torque forces applied by a fastener driving into the opening are optimally absorbed by the rib position, such that a quicker cycle time for screwing a component in place can be achieved.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A screwboss comprising:
   a base;
   a main body
   an opening into an end of the main body, distal from the base, for fixing a threaded fastener thereinto; and
   at least one rib, adjoining the base and the main body and defining a central plane and a side plane parallel to the central plane, to support the main body in an upstanding position,
   wherein the at least one rib extends away from the main body at an offset position oriented such that the central plane or the side plane of the at least one rib extends in a direction coinciding with a tangent line from the opening and parallel with a radial line of the opening, such that an in use torque force coinciding with the tangent line applied to a surface of the opening by the threaded fastener passes through the at least one rib.

2. The screwboss of claim 1 wherein the tangent line coincides within a thickness of the at least one rib.

3. The screwboss of claim 1 wherein the at least one rib includes a first external surface in line with the radial line and a second surface in line with the tangent line.

4. The screwboss of claim 1 wherein the at least one rib is tapered inwardly in a longitudinal direction from the base toward the main body.

5. The screwboss of claim 1 wherein the at least one rib, extending outwardly from the main body, has a draft angle.

6. The screwboss of claim 1 wherein the at least one rib includes a plurality of ribs, each at an offset position coinciding with a tangent line from the opening.

7. The screwboss of claim 6 wherein each rib of the plurality of ribs radiates at an even spacing about the main body.

8. The screwboss of claim 1 configured for a right-hand screw threaded fastener, wherein the at least one rib is offset in a counter-clockwise direction from the radial line.

9. The screwboss of claim 1 wherein the at least one rib is offset far enough so as not to overlap with the radial line.

10. The screwboss of claim 1 wherein the at least one rib includes a flat planar body extending form the main body in parallel with the tangent line and the radial line along an extent of the at least one rib.

11. The screwboss of claim 1 wherein the at least one rib includes a central plane that coincides with the tangent line.

12. A component comprising the screwboss of claim 1.

13. The component of claim 12 wherein the component is part of a vehicle.

14. A method for mounting a first component part to a base component part, the method comprising:
   forming a screwboss into a surface of the base component part, wherein:
   the screwboss includes:
      a base;
      a main body;
      an opening into an end of the main body, distal from the base, for fixing a threaded fastener thereinto; and
      at least one rib, adjoining the base and the main body and defining a central plane and a side plane parallel to the central plane, to support the main body in an upstanding position, and
      the at least one rib extends away from the main body at an offset position oriented such that the central plane or the side plane of the at least one rib extends in a direction coinciding with a tangent line from the opening and parallel with a radial line of the opening, such that an in use torque force coinciding with the tangent line applied to a surface of the opening by the threaded fastener passes through the at least one rib;
   aligning an opening of the first component part with the opening into the main body; and
   inserting a fastener through the aligned openings and turning the fastener, in a direction counter to an offset in the at least one rib, to engage and be driven into the opening in the main body.

15. The method of claim 14 wherein the base component part is part of a vehicle.

* * * * *